June 29, 1954 E. L. CLARIDGE ET AL 2,682,395
DIVIDED DOWNCOMER FOR TRAYS OF FRACTIONATING COLUMNS
Filed Jan. 19, 1952
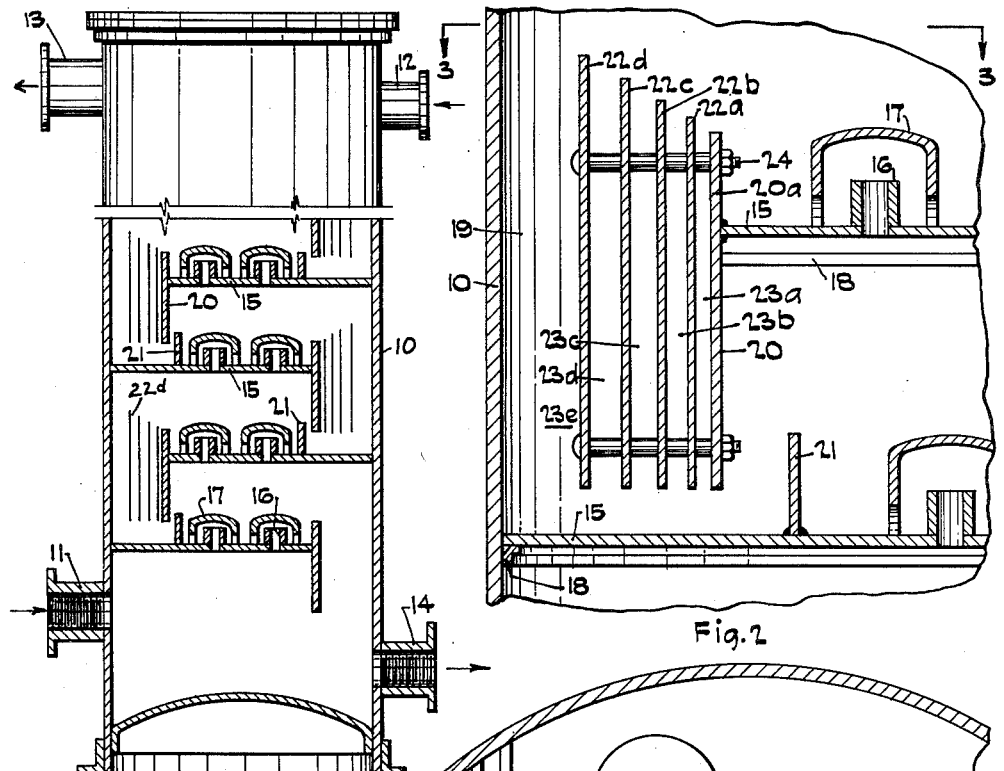
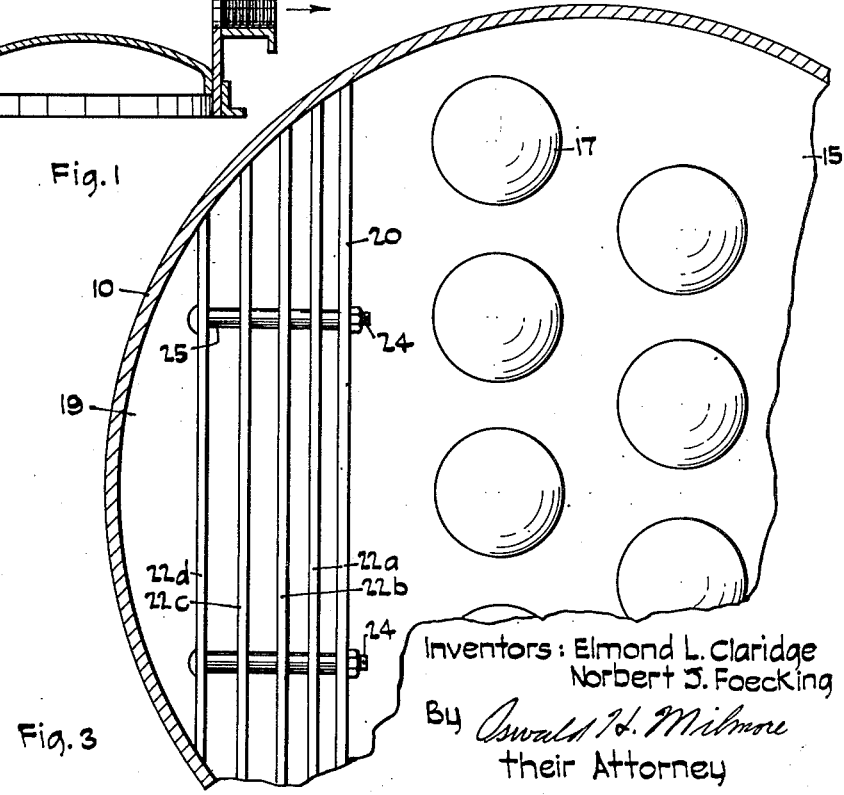
Inventors: Elmond L. Claridge
Norbert J. Foecking
By Oswald H. Milmore
their Attorney Patented June 29, 1954

2,682,395

UNITED STATES PATENT OFFICE 2,682,395

DIVIDED DOWNCOMER FOR TRAYS OF FRACTIONATING COLUMNS

Elmond L. Claridge, Houston, Tex., and Norbert J. Foecking, Cleveland, Ohio, assignors to Shell Development Company, Emeryville, Calif., a corporation of Delaware Application January 19, 1952, Serial No. 267,290

6 Claims. (Cl. 261—114)

The invention relates to fluid contact columns having a plurality of vertically spaced trays provided with downcomers or downspouts for transferring liquid from the tray to a lower tray; more particularly, it is concerned with an improved downcomer that is divided into a plurality of downflow channels by partitions. While particularly useful when employed in fractional distillation columns, wherein vapors ascend from stage to stage and liquid descends, the downcomer may be employed to advantage in other contact columns, e. g., those used for absorption, wherein a multi-component gas is supplied at the bottom and an absorbent liquid is supplied at the top, or those used for effecting countercurrent contact between liquids of different densities, such as a solvent and a hydrocarbon oil.

In such columns the trays contain means for effecting intimate contact between the fluids; thus, in distillation the gas ascends through vapor risers covered by bubble caps or through perforations or slots in the tray and agitates the liquid on the tray, creating a foam having a density that is considerably lower than that of the pure liquid. This foam is carried down in the downcomers, resulting in a column of decreased density in the downcomer and greatly lowering the liquid head at the bottom of the downcomer. This decreases the pressure drop that can be developed between trays without causing flooding and thereby limit the capacity of the column. Most of the entrained vapor separates in the downcomer and rises in opposition to the descending liquid, thereby interfering with the free downward flow of liquid and forming more foam, thereby aggravating the situation. Foam is also generated in the downcomers themselves when liquid falls into the liquid pool in the bottom of the downcomer.

The use of downcomers of greater cross-sectional area facilitates settling and results in an increase in the carrying capacity of the downcomer but reduces the tray area available for bubble caps or other contact devices. It has been proposed to provide special return ducts within the downcomer that open near the bottom thereof to receive vapor and extend to above the top of the downcomer to discharge this vapor to the space above the tray; this, however, requires the vapor to be carried to the bottom of the downcomer before entering the return duct and does not prevent foam formation within the downcomer itself. Hence, such ducts do not greatly increase the density of the liquid or significantly improve the liquid carrying-capacity per unit total cross-sectional area of the downcomer.

It is an object of the invention to provide an improved downcomer having increase liquid carrying capacity for a given cross-sectional area. Further objects are to improve the flow of liquid through the downcomer by segregating the descending liquid into a plurality of streams having different concentrations of entrained vapor or foam: and to provide a plurality of downflow channels of different sizes in accordance with the requirements for the upflow of vapor in the individual streams.

In summary, according to the invention, the downcomer is provided with partitions dividing the downcomer into a plurality of downflow channels all of which are open at the top at a level to receive liquid from the tray. More specifically, the partitions are preferably arranged at different distances from the liquid-supporting portion of the tray, measured in the direction of liquid flow therefrom into the downcomer, whereby the liquid of greatest density enters the nearest downflow channels and liquid of progressively lower density enters more distant channels. It is advantageous to arrange the partitions at progressively different intervals whereby the downflow channels farthest from the liquid-supporting part of the tray are widest.

By this arrangement, liquid from the tray is separated from the foam and the separated streams are transported separately. The downcomer provides approximately proportionate times for the various density portions of the foam or liquid to break or settle. It further prevents or greatly reduces the generation of foam, such as takes place in the usual type of downcomer when liquid falls into the pool of liquid in the downcomer, by providing a plurality of small channels for the liquid to run through.

The invention will be described in greater detail by reference to the accompanying drawing showing one specific embodiment thereof by way of illustration, wherein:

Figure 1 is an elevation view, partly in section of a fractionating column wherein the invention is applied;

Figure 2 is an enlarged vertical sectional view of a part of Fig. 1; and

Figure 3 is a section taken on line 3—3 on Fig. 2.

Referring to the drawing in detail, 10 represents the side wall of a fractional distillation column which may have any desired number of connections, such as 11 and 12 for vapor and liquid, respectively, and outlets 13 and 14 for vapor and liquid, respectively. The column contains a plurality of trays 15 arranged in vertically spaced relation and extending transversely across the column and dividing the latter into a series of superposed distillation stages. The trays are adapted to support liquid and are provided with suitable gas and liquid contact elements of any desired type, such elements being generically represented by bubbler assemblies comprising vapor riser tubes 16 and bubble caps 17 having seal skirts that extend downwardly beneath the tops of the riser tubes and beneath the liquid maintained on the trays but permit the escape of vapor beneath the skirts. It should be understood that the downcomers may be employed with trays of other types, such as those employing perforations or slots for the passage of vapors without caps, wherein the upflow of vapor prevents the free drainage of liquid through the perforations or slots. The trays may be sealed to the column wall by any means, such as by being fastened to annular support rings 18.

Each tray has one or more openings provided with downcomers of desired outline for the downward passage of liquid; in the embodiment shown, one opening 19 with a straight edge is provided for each tray at one side thereof, adjacent trays having their openings at opposite sides. Each opening has a wall structure such as a flat plate 20 sealed to the edge of the opening and at the ends thereof, to the column wall and extending downwardly from the tray close to the next lower tray to be immersed in the liquid therein so as to isolate a downflow channel against entry of vapor from the stage beneath the respective tray. In the embodiment shown, the column wall forms one wall of the downcomer. It is preferable to provide an overflow weir near the edge of the opening so as to retain liquid to a desired level on the liquid-supporting portion of the tray; this may be effected by extending the plate above the tray as shown at 20a. Optionally, a distributing weir 21 may be mounted on each tray near the downcomer from the next higher tray to promote uniform distribution of liquid across the width of the downcomer. The plate 20 and weir 21 may be secured by welding, as indicated.

In accordance with the invention, each downcomer is provided with a plurality of partitions. Thus, these may be flat, parallel plates 22a, 22b, 22c and 22d, extending the full width of the downcomer to the column wall and rising from the bottom of the downcomer to progressively greater heights above the top of the overflow weir 20a. It is preferable, although not in every case essential, to mount the partitions at progressively greater horizontal intervals in the order of their distances from the weir, and to space the last partition 22d at a considerable distance from the far wall of the downcomer (i. e., from the column wall 10 in the embodiment shown). The partitions thereby provide a series of parallel downflow channels 23a, 23b, 23c, 23d and 23e that are progressively greater in the order stated, the last of these being the widest and being preferably several times as wide as the widest of the others, as shown. It is not essential that the partitions be sealed at their ends or that the partitions be imperforate. They may be supported by any suitable means, such as a plurality of bolts 24 fixed to the plate 20 and threaded through holes in the partitions, ferrules 25 having suitable lengths to maintain the partitions at the desired intervals being placed on the bolts.

In operation, liquid from each tray overflows the weirs 20a. The liquid of highest density being nearest the bottom, it enters the first downflow channel 23a, while liquid of progressively lower density and containing more foam enters the channels that are progressively greater distances from the weir. This segregation is aided by the graduated heights of the partitions. Most of the liquid is carried by the first few channels, with very little contact with ascending vapor. The material that enters the last channel 23e contains relatively the greatest proportion of entrained vapor; being of larger cross-sectional area, it facilitates the settling of the liquid and the upflow of the entrained vapor.

It wil be seen that by thus segregating the liquid into a plurality of streams in accordance with their densities, there is brought about a more efficient use of the total cross-sectional area of the downcomer, since the relatively dense liquid is free to flow without interference from the ascending vapors. Also, by providing several downflow channels, the liquid runs down more slowly and splashing of descending liquid into the pool is minimized, thereby obviating the generation of foam within the downcomer, and contact of foamy liquid with the extended partition surfaces promotes coalescence. These advantages accrue regardless of whether the channels have graduated widths as shown. Further, by graduating the channel widths, those streams that require a slower flow velocity to permit coalescence and disentrainment of the vapor are given channels of relatively greater widths; relatively greater settling times for the less dense foam is thereby provided.

This arrangement increases the capacity of fractionating and similar gas and liquid contact columns, which are limited in their liquid handling capacities because of foaming, whether this foam be produced on the tray or in the downcomer. In the case of trays spaced 24 inches vertically the liquid head in the downcomers can be increased five or six inches of liquid, resulting in an increase in capacity up to 15–30%.

We claim as our invention:

1. In combination with a tray of a fluid contacting column wherein trays are arranged in vertically spaced relation, said tray having an opening for the downflow of liquid, means forming a downcomer fitted to the edge of said opening and extending downwardly from said tray and one or more partitions spaced from the said edge and extending downwardly within said downcomer dividing the downcomer into a plurality of downflow channels situated at different distances from said edge, said channels communicating with the space above said tray at a level to receive liquid therefrom and being open at the bottom.

2. The combination according to claim 1 wherein at least two partitions are provided within the downcomer, said partitions being situated at progresively greater distances from the said edge of the opening in the tray.

3. The combination according to claim 2 wherein the downflow channel farthest from the edge is wider than the other downflow channels.

4. In combination with a tray of fluid contacting column wherein trays are arranged in vertically spaced relation, said tray having an opening for the downflow of liquid, an overflow weir near the edge of said opening extending above the tray, means forming a downcomer fitted to said opening and extending downwardly from said tray and a plurality of partitions extending downwardly within said downcomer and spaced at progressively greater distances from said weir dividing the downcomer into a plurality of downflow channels, said channels communicating with the space immediately above the level of the tray to receive liquid that overflows the weir from said tray, said channels being open at the bottom.

5. The combination according to claim 4 wherein said partitions extend above said weir for progressively greater distances in the order of their distances from the weir.

6. The combination according to claim 5 wherein the partitions are spaced apart at progressively greater horizontal intervals in the order of their distances from said weir, the last partition being spaced from the far wall of the downcomer by an interval greater than the other intervals between adjoining partitions, whereby the downflow channel farthest from said weir is wider than the other downflow channels.

References Cited in the file of this patent

UNITED STATES PATENTS

| Number | Name | Date |
|---|---|---|
| 1,862,758 | Merley | June 14, 1932 |
| 2,385,355 | Gerhold | Sept. 25, 1945 |
| 2,501,114 | Whaley | Mar. 21, 1950 |
| 2,508,528 | McPherson | May 23, 1950 |

FOREIGN PATENTS

| Number | Country | Date |
|---|---|---|
| 878,151 | France | Sept. 28, 1942 |
| 129,017 | Austria | July 11, 1932 |